Aug. 18, 1970 C. L. HEFLIN ET AL 3,525,010

IMAGE ORTHICON BEAM CONTROL CIRCUIT

Filed April 1, 1968 2 Sheets-Sheet 1

INVENTORS.
CHESTER L. HEFLIN
ARTHUR H. MENGEL
BY [signature]
ATTORNEY

IMAGE ORTHICON BEAM CONTROL CIRCUIT

Filed April 1, 1968 2 Sheets-Sheet 2

INVENTORS.
CHESTER L. HEFLIN
ARTHUR H. MENGEL
BY
ATTORNEY

United States Patent Office 3,525,010
Patented Aug. 18, 1970

3,525,010
IMAGE ORTHICON BEAM CONTROL CIRCUIT
Chester L. Heflin, Schwenksville, and Arthur H. Mengel, Pottstown, Pa., assignors to Teltron, Inc., Boyertown, Pa., a corporation of Pennsylvania
Filed Apr. 1, 1968, Ser. No. 717,833
Int. Cl. H01j *31/48*
U.S. Cl. 315—11 7 Claims

ABSTRACT OF THE DISCLOSURE

Television camera circuitry for use in conjunction with an image orthicon tube wherein improved beam and target control circuitry is provided to balance the beam and target voltage, and wherein voltage regulating means is connected between the target and a generating means and voltage regulating means is provided between the generating means and a grid for controlling the current of the beam.

BACKGROUND OF THE INVENTION

Field of the invention

This invention relates to improved external automatic beam and target control circuitry for an image orthicon tube wherein the beam current is maintained constant over a wide range of light levels.

Description of the prior art

The image orthicon tube is well known in the art and is most often used in television systems. Image orthicon tubes are used for black-and-white or color television image transmission. Typical image orthicons are produced by the Electron Tube Division of RCA and bear model numbers such as 7513, 4415 and the like.

While these tubes have achieved wide acclaim and use it is nuecessary to provide complicated circuitry in the camera to compensate for variations in beam and target current levels due to variations in light levels. This circuitry generally requires constant manual adjustment to maintain the proper balance and is not entirely satisfactory. In addition extra personnel are required and close supervision of the camera system to insure that no overload and consequent tube damage results.

SUMMARY OF THE INVENTION

This invention is related to camera circuitry for use in a television camera in conjunction with an image orthicon tube which provides for balancing of the beam and target voltages.

The principal object of the present invention is to provide a control circuit for an image othicon tube.

Another object of this invention is to provide an improved control circuit for an image orthicon tube in which the control circuitry has fewer parts than heretofore required.

Another object of this invention is to provide a control circuit for an image orthicon tube having improved operating characteristics and which is relatively simple and inexpensive to manufacture.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part thereof, in which.

Figure 1:
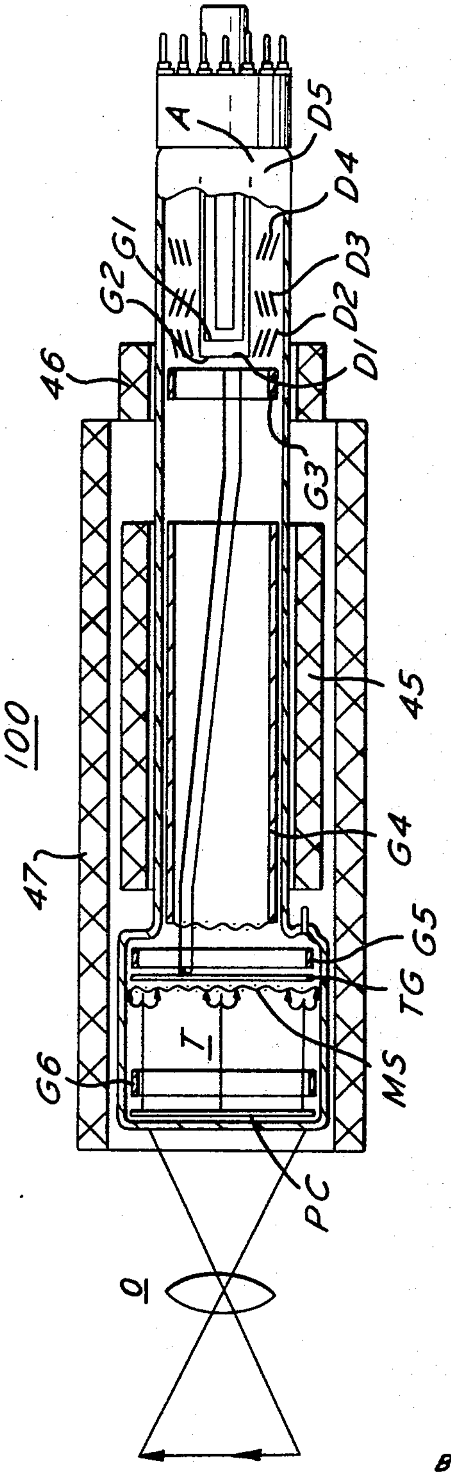
FIG. 1 is a cutaway plan view of a representative image orthicon tube used with the circuitry of the present invention.

It should, of course, be understood that the description and drawings herein are illustrative merely, and that various modifications and changes can be made in the structure disclosed without departing from the spirit of the invention.

Like numerals refer to like parts through out the several views

DESCRIPTION OF THE PREFERRED EMBODIMENT

Reference will now be had more particularly to the drawings.

While the subject invention does not relate to image orthicon tubes per se. a brief discussion of image orthicon tube construction is useful. The orthicon tube 100 generally includes an image section, a scanning section and a multiplier section. In the image orthicon tube the image section contains a semi transparent photo-cathode PC on the inside of the faceplate, a grid G6 to provide an electrostatic accelerating field, and a target T which is a thin glass disc and has a fine mesh wire screen MS closely spaced to it on the photocathode side. Focusing is accomplished by means of a magnetic field produced by external coil 45 and alignment coils 46 and 47 and by varying the photocathode voltage.

Light from the subject is focussed onto the photocathode by an appropriate optical system shown diagrammatically at O. The light image is translated into an electron image which in turn is directed toward the target section by a combined electrostatic and electromagnetic focusing system. The photoelectron emission is directly proportional to the light intensity which has been directed onto the photocathode PC from various parts of the scene. Because of the electrostatic-magnetic focusing system the electrons approach the target T in an array identical to the light image on the photocathode PC. The electrons leaving the photocathode PC have a large range of velocities varying substantially in speed and direction requiring a magnetic focusing field to swing these off-axis electrons into a helical beam. Proper focusing is achieved when the photocathode voltage is adjusted so that the individual electrons will exactly achieve one complete helical path and return to the same angular position at the target as they travel from photocathode to target.

As electrons bombard the target T which is fabricated of insulating material, secondary electrons are excited at the surface. The accelerating voltage of the primary electrons can be adjusted such that the number of secondary electrons leaving the insulator is exactly equal to the number of primary electrons arriving. Thus, the ratio of primary to secondary electrons is equal to unity. The potential at which this occurs is called the first crossover potential. When the electrons are accelerated toward an insulator by potentials which are under the first crossover potential, the insulator will tend to go negative until it is approximately equal to the cathode potential. Once it has reached this equilibrium potential, no further electrons can reach the insulator since the electrons leaving the cathode would be moving against a retarding electric field. Similar considerations show that if an insulator is bombarded above the first crossover potential, the secondary electrons would have to travel against a retarding field to reach the collector under these conditions and would return to the target T with a velocity less than the crossover, thereby driving the target negative until equilibrium is reached. Velocity of the secondaries are ignored in these considerations.

Having referred to the above basic principles of secondary emission, it can be seen that if electrons leaving the photocathode PC are energized above the crossover potential as they approach the target T, the photocathode side of the target will be charged positively by signal information from the photocathode. Similiarly, if the scanning beam is kept below the first crossover potential, it will tend to charge toward cathode potential any element of the target T being scanned.

The target structure above described has the advantage of storage. Information coming from a raster element on the photocathode PC is written on the target T continually during frame time. Thus, the voltage on the target section corresponding to a scene element of information continually builds up during frame time even though this information is used for only a fraction of a micro-second during the scanning operation. Some amplification occurs at the target T due, to a high secondary emission ratio at the writing side of the target. That is, for each writing electron that lands in the writing of the image, on the order of 5 electrons are effective in writing information on the target.

Information is written by photo-electrons on the writing side of the target T by the image section of the orthicon. The voltage at this side of the target increases, in the negative direction, in proportion to the intensity of the writing information. A the same time, the potential of corresponding elements on the reading side of the target T increases to a corresponding positive potential. This positive potential is detected by the scanning beam. Since this potential is positive relative to the target equilibrium potential, scanning beam electrons are able to land and are not retained in the return beam. The number of electrons subtracted from the scanning beam essentially constitutes the video signal. When the scanning side of the target T is brought to cathode potential by deposition of electrons from the scanning beam, the writing side of the target T becomes charged positively. However, the writing side of the target is capacity coupled to the mesh screen MS. Consequently, the target potential will not fall to the equilibrium potential as desired. For this reason it is necessary that the target T have sufficient conductivity to permit both sides of the target to attain the same potential within frame time. Conversely, the target T is not made excessively conducting in order to prevent leakage of information laterally and the resultant deterioration of image sharpness.

The scanning and multiplier sections of the tube consist essentially of an electron gun producing a very fine electron beam and a focusing system which is made up of accelerating grids G2 and G3, focusing grid G4 and decelerating grid G5. The amount of beam current being used to scan a target is controlled by grid G1, adjacent to the thermionic cathode in the electron gun. The focusing arrangement of the tube is such that dynode D1 is scanned during normal scanning of the target. The potential of grid G4 is adjusted to minimize pattern imperfections at dynode D1 and yet keep the image in proper form.

Noise, that is, random fluctuations in an electron beam such as the scanning beam of the image orthicon, is proportional to the square root of the current magnitude. For modes of operation of the tube which involve low light levels, it is possible for beam noise to become large relative to the signal. Thus, for low level operation it is desirable to decrease beam current magnitude to obtain an optimum signal to noise ratio while maintaining the ability to adequately discharge the signal on the target T.

In order to effect this operation, the external circuitry commonly used in connection with an image orthicon is modified to eliminate the so-called target control voltage circuitry and the beam control grid voltage circuit while maintaining a constant beam current.

Figure 2:
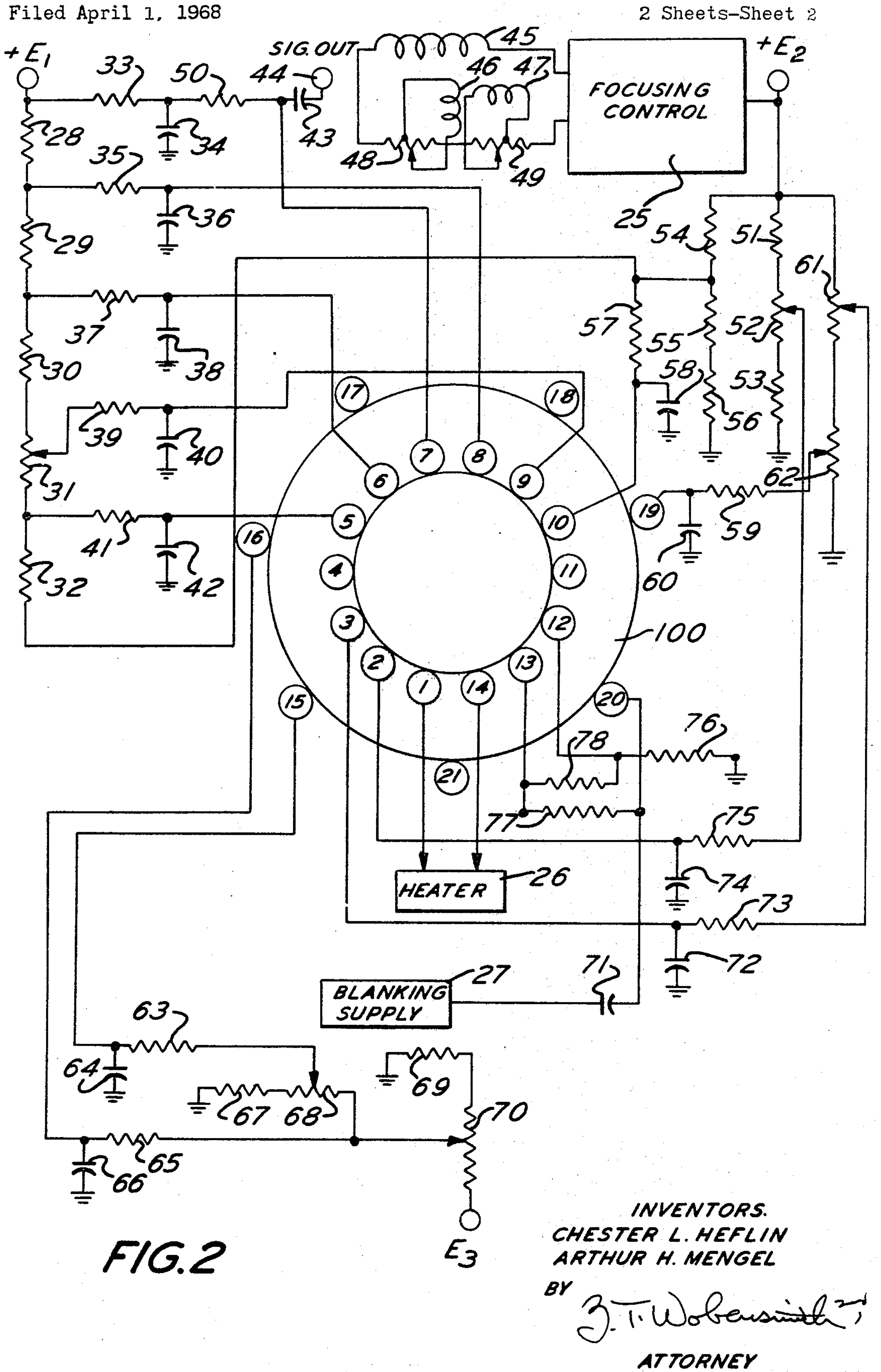
FIG. 2 is a schematic diagram of the camera circuitry incorporating the present invention.

In the schematic diagram (FIG. 2) the image orthicon tube 100 includes a plurality of terminals bearing reference numerals 1 through 21, inclusive. Terminals 1 and 14 are connected to a suitable heater 26. Terminal 7 is connected via blocking capacitor 43 to the signal output terminal 44. Terminal 44 may be connnected to a video amplifier (not shown). Capacitor 43 should be of sufficiently high quality to avoid leakage current that could introduce disturbing effects into the picture signal at the output.

A voltage divider network comprising resistors 28, 29, 30, 31 and 32 has one end thereof connected to the terminal +E1 which may represent, for example +1250 volts. Another voltage divider network comprising resistors 54, 55 and 56 is connected between source +E2, for example +330 volts, and ground. The other end of the first mentioned voltage divider network is connected to the junction of resistors 54 and 55. This junction is further connected via the filter network comprising resistor 57 and capacitor 58 to terminal 10. Terminal 10 is connected to the accelerating grid G2 which accelerates electrons emitted by the electron gun.

Terminal 5 is connected via a filter network comprising resistor 41 and capacitor 42 to the junction between resistors 31 and 32 of the first mentioned voltage divider network. Terminal 5 is connected to dynode D2 of the image orthicon tube.

Dynode D3 is connected to terminal 9 of image orthicon tube 100. Terminal 9 is connected via the filter network comprising resistor 39 and capacitor 40 to the tap of variable resistor 31 of the voltage divider.

The junction between resistors 29 and 30 of the voltage divider network is connected via the filter network comprising resistor 37 and capacitor 38 of terminal 6 of the image orthicon tube. Terminal 6 is connected to dynode D4 of the orthicon tube 100. Dynode D5 of the image orthicon tube 100 is connected at terminal 8. Terminal 8 is connected via the filter network comprising resistor 35 and capacitor 36 to the junction between resistors 28 and 29 of the voltage divider network.

It is seen that the several dynodes of the image orthicon tube 100 are supplied with suitable signals from the voltage divider network. The voltage network can be designed with the requisite degree of precision whereby close tolerances and optimum operation of the orthicon tube can be achieved. The dynodes effect multiplication of the scanning signal to produce a better signal-to-noise ratio. That is, the return beam (from the scanning beam) impinges upon dynode D1 and produces secondary emission. The secondary electrons are directed to dynode D2 and cause secondary emission there. This process is continued in each successive stage with increasing numbers of electrons, until the secondary emission from dynode D5 is collected at the anode A. Anode resistor 50 is selected for proper output current range.

Grids G3, G4 and G5 are located in the scanning section of the othicon tube. Grid G3 is connected to terminal 3. Terminal 3 is connected to the variable tap of resistor 61 via a filter circuit comprising resistor 73 and capacitor 72. Resistor 61 is connected in series with resistor 62 between source +E2 and ground.

A variable tap of resistor 62 is connected via the filter network comprising resistor 59 and capacitor 60 to terminal 19. Terminal 19 is connected to grid G5 of orthicon tube 100. Grid G4 of orthicon tube 100 is connected to terminal 2 which is connected via the filter network comprising resistor 75 and capacitor 74 to the variable tap of resistor 52. Resistor 52 is connected in series with resistors 51 and 53 between aforementioned source +E2 and ground.

Also associated with the scanning section of the orthicon tube 100 is the focusing control network. Focusing coil current regulator 25 is connected to supply current to the series combination of focusing coil 45 and resistors 48 and 49. Focusing coil 45 is operative to focus the electron beam produced by the electron gun. The alignment coils 46 and 47 are connected with resistors 48 and 49, respectively to pickoff an adjustable voltage across portions of the associated resistors. The alignment coils 46 and 47 are used for horizontal and vertical deflection of the electron beam.

In the image section of the orthicon tube 100, the photocathode PC is connected to terminal 16. Terminal 16 is connected via a filter network comprising resistor 65 and capacitor 66 to the variable tap of resistor 70. Resistors 69 and 70 are connected in series between a source —E3 and ground. Source —E3 may supply a voltage on the order of —550 volts. This applies a suitable potential at the photocathode of orthicon device 100 to produce optimum operation.

Also connected to the variable tap of resistor 70 is a series network comprising resistors 67 and 68 which are further connected to ground. The variable tap of resistor 68 is connected via the filter network comprising resistoı 63 and capacitor 64 to terminal 15 of orthicon tube 100. Terminal 15 is connected to grid G6 in the image section of the orthicon tube.

Terminals 4, 11, 17, 18 and 21 of the orthicon tube 100 are not connected to the control circuitry. This is a typical arrangement in circuitry known in the prior art. Moreover, for the most part the above described circuitry is typical.

In the instant invention, it is seen that terminal 20 is connected to the target T of the image orthicon tube 100 where the target T is in the image section thereof. Terminal 20 is connected via capacitor 71 to blanking supply 27. Blanking supply 27 supplies negative going signals on the order of —6 volts which are used to blank the image orthicon target after each horizontal scan and vertical scan field so that the horizontal and vertical retrace lines do not appear on the target. Moreover, terminal 20 is connected via resistor 77 to terminal 13 which is the therionic cathode of image orthicon tube 100 to maintain a voltage difference between the thermionic cathode and the target. In the past, it has been typical to connect thermionic cathode to ground and have no connection between the target and the thermionic cathode.

In addition, thermionic cathode terminal 13 is connected via resistor 78 to terminal 12 which is connected to grid G1 in the multiplier section of the orthicon tube. In the past, it has been the practice to connect grid G1, via a relatively complex control circuit, to a suitable potential without permitting any interconnection between thermionic cathode and grid G1.

Moreover, grid G1 is connected via resistor 76 to ground whereby a substantially fixed potential is supplied via a simple, uncomplicated control network. This circuit reduces the beam current magnitude a small percentage. This permits the target T to be discharged when the thermionic cathode is negative with respect to the target T.

Operation of the circuit described is, for the most part, typical of that known in the prior art. However, in this circuit the beam control voltage circuit for grid G1 and the target control voltage circuitry have been eliminated. Other circuitry which lowers the beam magnitude by a small percentage has been inserted. This circuitry insures that the beam magnitude is at a constant level whereby the target is brought to zero potential at various light levels on the photocathode. The foregoing is provided by connecting resistor 76 from ground potential to control grid G1 at terminal 12 and connecting resistor 78 from control grid G1 to the thermionic cathode at terminal 13. Resistor 77 is connected from thermionic cathode at terminal 13 to the target T at terminal 20.

Thus, when the thermionic cathode is heated, electrons begin to flow from ground potential through the fixed resistors 76 and 78 to the thermionic cathode. Current flow in resistor 78 sets up a positive potential on the cathode in direct proportion to the current flow. Additional current flow will bring the thermionic cathode to a more positive potential with respect to control grid G1 thereby reducing electron emission from the thermionic cathode and maintaining a constant current. Thus, the circuitry lowers the beam magnitude by a small percentage thereby insuring that a constant beam magnitude is supplied and the target is maintained at zero potential at various light levels on the photocathode.

Furthermore, this circuitry by producing a more constant beam magnitude, reduces random fluctuations (for example in the scanning beam of the orthicon) whereby the noise in the system is reduced. Since noise, i.e. random fluctuations in the signal is proportional to the square root of the current magnitude, maintaining the current magnitude substantially constant reduces spurious variations or noise. In addition, by maintaining the beam magnitude more constant, the target discharge over a wide range of light levels is insured. This effects a reduction in beam noise which exists at low light levels.

Other advantages of obtaining a more constant beam are the reduction of the possibility of overdriving the target causing target degradation. Moreover, the lateral leakage problem, which is a factor of "black noise", is substantially minimized. Also, there will be maintained a constant relationship between the scanning beam and the target while the target is at equilibrium potential. This effect causes the scanning beam to exhibit a more orthogonal landing on the target surface.

Having thus described a preferred embodiment of the invention, it should be noted that advantageous results can be obtained from this system which results are not obvious. The results are obtained by a substantial reduction in the number of parts used to control an image orthicon tube while producing improved operation thereof. Modifications of this system may be suggested to those skilled in the art. However, any modifications which fall within the purview of the inventive concepts are intended to be included herein.

We claim:

1. A control circuit for an image orthicon tube which comprises
- means for generating an electron beam,
- means for detecting the electron beam,
- means for focusing the electron beam,
- first grid means for controlling the current of the electron beam, and
- target means for storing information which is sampled by the electron beam,
- said target means and said means for generating having first voltage regulating means connected thereto, and
- said means for generating and said first grid member having second voltage regulating means connected therebetween.

2. The control circuit as defined in claim 1, wherein, said means for generating includes thermionic cathode means.

3. The control circuit as defined in claim 2 wherein said first voltage regulating means comprises
- first impedance means connected between said thermionic cathode means and said target means, and
- first source means is connected to the junction of said first impedance means and said target means.

4. The control circuit as defined in claim 3 wherein said first source means comprises means for selectively supplying negative going pulses for effectively blanking said target means by clamping said target means to a suitable potential level.

5. The control circuit as defined in claim 3 wherein
- said second voltage regulating means comprises a second impedance means connected between said thermionic cathode means and said first grid means, and second source means is connected to the junction of said second impedance means and said first grid means.

6. The control circuit as defined in claim 5 wherein said second source means comprises reference potential supplied means.

7. The control circuit as defined in claim 1 including, first D.C. conductive means connected between said target and said means for generating, and second D.C. conductive means connected between said means for generating and said first grid means.

References Cited

UNITED STATES PATENTS

| | | | |
|---|---|---|---|
| 2,520,240 | 8/1950 | Flory | 315—11 |
| 2,537,250 | 1/1951 | Weimer | 315—11 |
| 2,637,002 | 4/1953 | Rose | 315—11 |
| 3,176,183 | 3/1965 | Jensen et al. | 315—11 |
| 3,423,623 | 1/1969 | Wendland | 312—12 X |

RODNEY D. BENNETT, Jr., Primary Examiner

T. H. TUBBESING, Assistant Examiner